United States Patent Office 2,936,853
Patented May 17, 1960

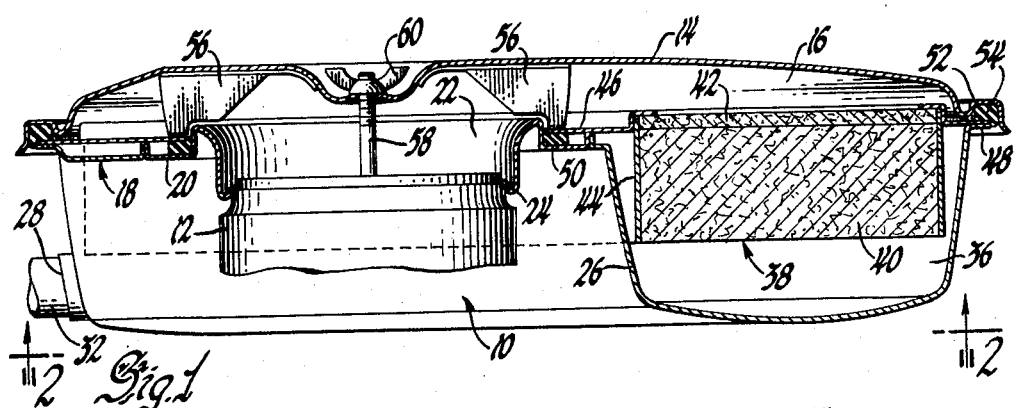
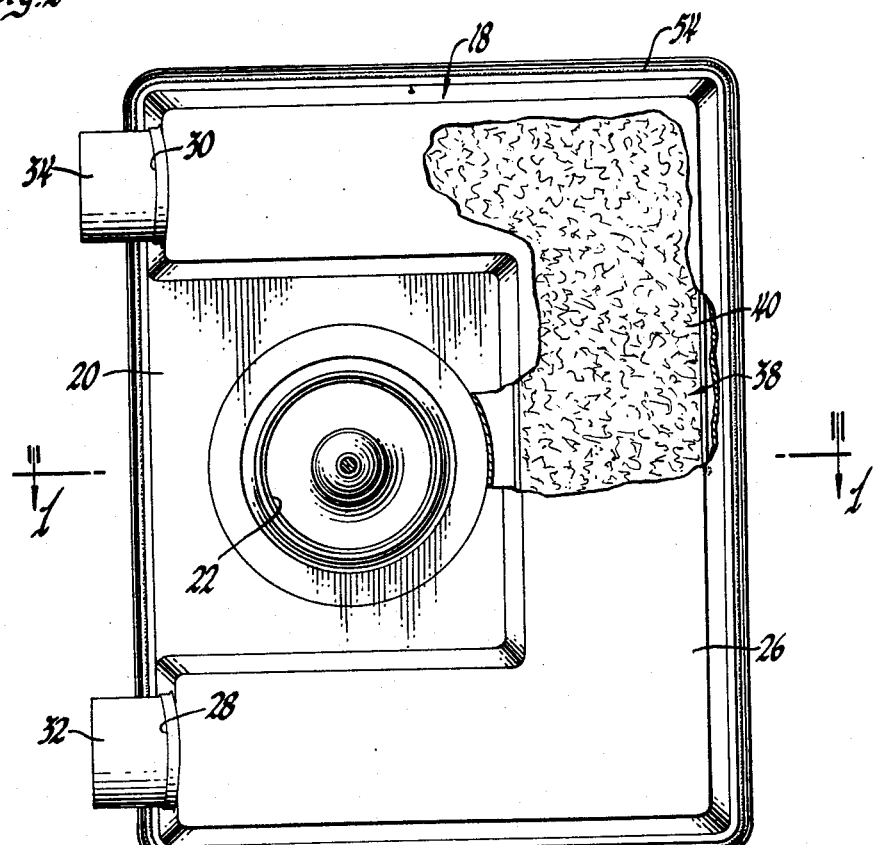

2,936,853

AIR CLEANER MEANS

Joseph N. Heller, Flint, and Norman J. Amlott, Grand Blanc, Mich., assignors to General Motors Corporation, Detroit, Mich., a corporation of Delaware Application June 4, 1956, Serial No. 589,211

5 Claims. (Cl. 183—43)

This invention relates to air cleaners generally and more particularly to vehicle engine air cleaners using panel type air filters.

Vehicle engine air cleaners have become increasingly large in size and to consume a great deal of space in the engine compartment of automotive vehicles. It has recently become important that such cleaner means be redesigned in order that they occupy less space particularly as to the height of the cleaner above the engine, as used with down-draft induction systems, to permit lowering the hood line for increased road visibility and other reasons.

It is here proposed to provide air cleaner means having a minimum height and such as may be nested about the inlet to the engine induction system. It is proposed to provide a filter housing having an air intake chamber formed partially around the induction system inlet and below the plane thereof with intakes formed at opposite ends of such chamber and extended forwardly thereof. A panel type filter member is received within the chamber and the cover means secured over the filter housing provides the air outlet passage means between the filter housing and the induction system inlet. The proposed cleaner is extremely simple in construction and compact in arrangement without sacrificing operational efficiency.

In the drawings:

Figure 1 is a cross-sectional side view of the proposed air cleaner means (as taken in the plane of line 1—1 of Figure 2).

Figure 2 is a reduced bottom view of the proposed air cleaner means, having a part broken away to show the filter panel, as taken in the plane of line 2—2 of Figure 1, looking in the direction of the arrows thereon.

The proposed, generally rectangular air cleaner means, as adapted for use with automotive engines, includes a filter housing 10 adapted to be received upon the inlet end of the engine induction system, as represented by the carburetor member 12. A cover member 14 is secured over the filter housing to provide air outlet passage means 16 connecting the housing to the engine induction inlet.

The filter housing 10 is formed by a wall member 18 which includes a flanged and rolled member 20 forming the outlet throat 22 and adapted for engagement upon a shoulder 24 of the carburetor member 12. A deep drawn depression 24 is formed from three sides of the wall member 18 to provide a substantially U-shaped chamber portion 26 extending partially around the carburetor member 12. Air inlet openings 28 and 30 are provided within the vertical end walls of the legs of the chamber portion 26 and conduits 32 and 34 are disposed therein.

The filter housing 10 as installed for automotive use has the air inlet conduits 32 and 34 extended forwardly in the direction the vehicle will travel and has the chamber portion 26 extending around the back of the carburetor member 12. The air inlet conduits 32 and 34 are disposed near the bottom of the chamber portion 26 and communicate with the air intake chamber 36 formed therein.

A panel type filter element 38 is disposed within the intake chamber 36 and includes a filter mass 40, such as neoprene coated hog hair, with a layer of more dense air filter media 42, bonded within a filter retaining shell 44 which includes a supporting plate 46 resting upon the flanged edge 48 of the housing wall 18 and a sealing ring 50 disposed about the outlet throat 22. The filter element is disposed within the air collecting chamber 36 in spaced relation to the side and bottom walls thereof.

The cover member 14 is dished out to provide the outlet passage means 16 mentioned. The edge of the cover member is formed as at 52 to retain a sealing ring or gasket 54 which engages and seals the supporting plate 46 of the filter element 38 to flange 48 of the filter housing. Radially disposed and depending spacer members 56 are secured to the cover member directly over the filter housing outlet 22 and engage the inner edge of the filter element supporting plate 46 to the sealing ring or gasket 50. The cover is itself retained upon the filter housing, and the housing upon the carburetor member, by a threaded stud 58 extending upwardly from the carburetor member and through the cover member to receive wing nut 60.

The air cleaner means proposed, installed upon an engine carburetor member or the like as described, receives air through the inlet conduits 32 and 34, which are below the plane of the cleaner outlet 22, and into the air chamber 36 from whence it passes through the filter element 38, into the air outlet passage means 16 formed by cover member 12, and to the cleaner outlet 22.

We claim:

1. Air cleaner means including a filter housing member having an outlet opening formed therethrough and a filter receiving chamber of substantially U-shape in the horizontal plane of said housing member and formed from said housing member, said chamber being formed with leg portions extending partially around and depending below said opening and having vertical end walls at the ends of the leg portions thereof, filter means received within said chamber, air inlet means provided through said vertical end walls, and a cover member secured over said housing member to provide air passage means between said chamber and said outlet opening.

2. Air cleaner means comprising a filter housing formed from a member having an outlet opening provided therethrough and a substantially U-shaped chamber depression formed in the horizontal plane of said housing and extending below and only partially around said opening, said U-shaped chamber depression including legs terminating in vertical end walls adjacent one edge of said housing, filter panel means received within said chamber, air inlet means provided through said end walls and below said filter panel means, and a cover member secured to said housing in spaced relation over said chamber and said opening for providing air passage means therebetween.

3. Air cleaner means for use with an air intake member and which includes a generally rectangular filter housing having an opening formed therethrough which is receivable about said intake member, a horizontally disposed substantially U-shaped chamber formed within said housing and extending below and partially around said opening, said U-shaped chamber including legs terminating in vertical end walls adjacent one side of said housing, air filter means disposed within said chamber and disposed in spaced relation to the bottom wall thereof, air intake means formed through said vertical end walls between said filter means and the bottom wall of said chamber, and cover means disposed in spaced relation over said chamber and said opening and secured to said housing for providing outlet air passage means between said chamber and said opening.

4. Air cleaner means including a filter housing formed from a member having an air outlet opening provided therethrough and a horizontally disposed chamber depression of substantially U-shape formed along three sides thereof and partially around said opening, said depression depending below the level of said opening and having legs terminating in vertical end walls, an air filter panel member receivable within said chamber depression, said panel member including a supporting plate engaged with the top edges of said chamber depression for disposing said filter panel in spaced relation therewithin and from the bottom wall thereof, air inlet means provided through said vertical end walls of the legs of said chamber depression between said filter panel and the bottom wall of said chamber, and a cover member secured to said housing member in spaced relation over said chamber and said outlet opening to provide air outlet passage means therebetween.

5. An air cleaner comprising a rectangular housing member having a horizontally disposed U-shaped chamber depression formed therein and along the side and back walls thereof, an outlet opening provided centrally of the forwardly disposed ends of said chamber depression formed in said housing and separate from said chamber depression, said outlet opening being formed through said housing above the lower extremity of said chamber depression for receiving means for connection thereto within the protection of the walls of said chamber depression, air cleaning filter means received within said chamber depression and spaced from the bottom wall thereof, a cover member disposed over said housing for closing the upper face of said chamber depression and forming outlet passage means conecting said chamber with said outlet opening, and air inlet openings formed within each forwardly disposed end of said chamber depression and below said filter means for admitting air to said chamber below said filter means.

References Cited in the file of this patent

UNITED STATES PATENTS

| | | |
|---|---|---|
| 1,556,592 | Donaldson | Oct. 13, 1925 |
| 1,873,252 | Altgelt | Aug. 23, 1932 |
| 1,926,433 | Cartmell | Sept. 12, 1933 |
| 2,069,379 | Moe | Feb. 2, 1937 |
| 2,198,963 | Garner | Apr. 30, 1940 |
| 2,689,551 | Heller et al. | Sept. 21, 1954 |
| 2,788,086 | Sebok | Apr. 9, 1957 |

FOREIGN PATENTS

| | | |
|---|---|---|
| 719,650 | Germany | Apr. 13, 1942 |
| 129,252 | Australia | Sept. 22, 1948 |
| 838,519 | Germany | May 8, 1952 |